Feb. 7, 1967  J. E. HEIDER ET AL  3,303,251
METHOD AND APPARATUS FOR EXTRUDING TUBING WITH CONTINUOUS
INTERNAL REENFORCEMENT MEMBERS
Original Filed Jan. 4, 1965
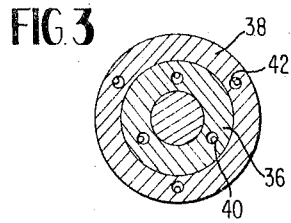
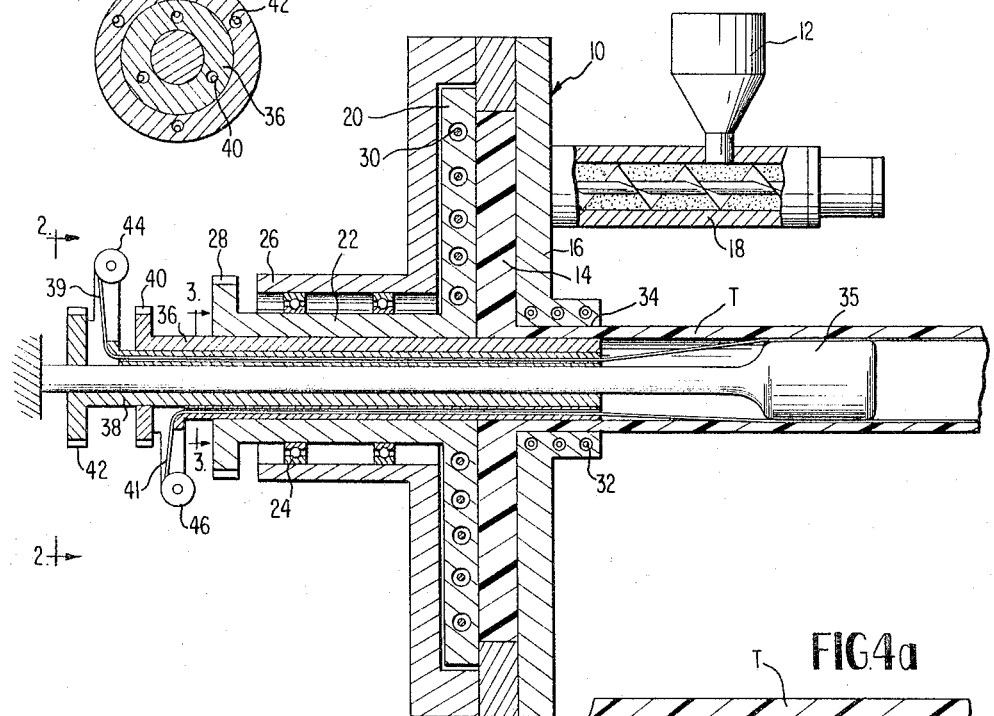
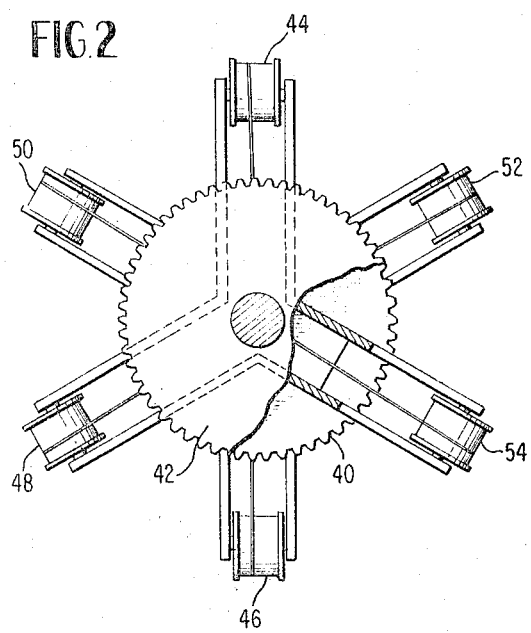
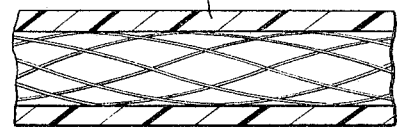
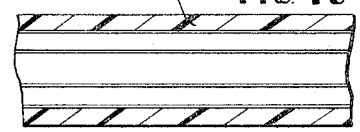
INVENTORS
THOMAS R. SANTELLI
JAMES E. HEIDER
BY W. A. Schaich & Clason N. White
ATTORNEYS

United States Patent Office 3,303,251
Patented Feb. 7, 1967

3,303,251
METHOD AND APPARATUS FOR EXTRUDING TUBING WITH CONTINUOUS INTERNAL REENFORCEMENT MEMBERS
James E. Heider, Toledo, and Thomas R. Santelli, Sylvania, Ohio, assignors to Owens-Illinois, Inc., a corporation of Ohio
Continuation of application Ser. No. 422,917, Jan. 4, 1965. This application May 13, 1966, Ser. No. 560,354
16 Claims. (Cl. 264—173)

The present invention relates to an apparatus for the extrusion of tubing while simultaneously effecting a reenforcement thereof by embedding continuous fibers or the like in the internal surface of the tubing. This application is a continuation of our copending U.S. application Serial No. 422,917, filed January 4, 1965, now abandoned.

In recent years there has been an increasing interest in plastic tubing reenforced with fibers. Various machines have been devised for reenforcing such tubing by means of continuous fibers, strands or filaments which may be made of glass, metal, or organic materials such as nylon, rayon and sisal. However, these machines for manufacturing such reenforced tubing have several disadvantages. Thus where the reenforcing fibers are introduced within the extruder, problems arise with respect to excessive heating of the fibers and the breakage thereof within the extruder. In other instances machines devised for effecting a continuous reenforcement of plastic tubing during the extrusion thereof have proven very bulky, complicated, expensive, and unreliable in operation due to frequent breakdowns in the feeding of the fibers to the extruded tubing.

Accordingly, one of the objects of the invention is to avoid the above as well as other disadvantages and provide an improved method and apparatus for embedding fiber reenforcement in extruded tubing.

A further object of the present invention is to provide such a method and apparatus capable of depositing fibers on the interior surface of tubing in a continuous manner whereby the likelihood of breakage or severance of the fibers is minimized.

A still further object of the present invention is to provide such apparatus capable of achieving the above objects and which apparatus is reliable in operation and not subject to frequent adjustment or repair.

According to the present invention, the foregoing objects are attained by first extruding the tubing through a suitable shaping mechanism such as a centripetal extruder of the general type illustrated by U.S. Patent No. 3,046,603 to Maxwell and U.S. Patent No. 3,032,814 to Miner. After the tubing leaves the extruder, it is passed over a mandrel which sizes the internal diameter of the tubing. Glass fibers are then fed continuously through a mandrel within the extruder and are brought over the mandrel. The hot extruded tubing is drawn over the mandrel, which is preferably cooled, and flows over the fibers encasing them within the tubing. Thereafter the tubing is cooled to set completely the tubing. In further explanation of the present invention, reference is made to the drawing in which:

FIG. 1 is a schematic cross section of apparatus embodying the present invention;

FIG. 2 is an end view taken along line 2—2 of FIG. 1 with part of the apparatus broken away;

FIG. 3 is a cross section taken along line 3—3 of the apparatus of FIG. 1;

FIG. 4a is a longitudinal cross section of the tubing product made by the apparatus of FIG. 1;

FIG. 4b is a longitudinal cross section of the tubing product made by the apparatus of FIG. 1 wherein one stationary and one rotary mandrel are employed; and FIG. 4c is a longitudinal cross section of the tubing product made by the apparatus of FIG. 1 wherein both mandrels are stationary.

Referring now to FIG. 1, there is shown schematically a centripetal extruder 10 comprising a hopper 12 containing thermoplastic material which is introduced into the melt chamber 14 through an opening in cover plate 16 by means of a worm mechanism 18. The extruder 10 is provided with a rotary member 20 which is attached to a shaft 22 mounted in a suitable bearing 24 in the casing 26 and is constantly rotated by a motor (not shown) through a gear 28. Heating elements 30 are provided in rotor member 20 in addition to heating elements 32 to heat the plastic material to a temperature which will give it the desired fluidity for extrusion.

As is well known in the art the centripetal extruder 10 operates as follows: The plastic material is fed from hopper 12 by means of worm 18 through an opening in cover plate 16 into the melt chamber 14. The heating elements 30 and 32 are then turned on to melt the plastic material into a liquid mass. Thereafter the motor is started and effects rotation of the shaft 22 and rotor member 20. This rotation results in the melted plastic material between cover plate 16 and rotor member 20 to become sheared. As the rotational speed is increased the shearing stress is also increased and a force normal to this stress is developed which results in the pumping and extrusion of the plastic material out through the extrusion channel or die 34 and over a fixed sizing mandrel 35. As is also known in the art, sufficient heating can be obtained by the friction caused by rapid rotation of the member 20 without the use of electrical heating elements.

In addition, there is also provided within shaft 22 an inner mandrel 36 and an outer mandrel 38 connected to suitable gears 40 and 42, respectively. A motor (not shown) is connected to each of gears 40 and 42 to effect rotation of the mandrels connected thereto. As shown in FIG. 3, mandrels 36 and 38 have a plurality of openings 37 and 37', respectively, therein through which fibers 39 and 41, such as glass, are threaded, from bobbins 44 and 46, respectively.

To reenforce plastic tubing internally in accordance with the present apparatus, glass fibers are manually drawn from the bobbins 44 and 46 and threaded through the openings 37 and 37' in mandrels 36 and 38, respectively, and over mandrel 35. The extruder 10 is then started up and the tubing T in plastic condition is extruded from die openings 34 over mandrel 35 which has the fibers 39 and 41 thereon. Due to the hot plastic nature of the tubing the fibers issuing from the openings in the mandrels are pulled forward and completely encased. One or both mandrels can be rotating or stationary as described more fully below. The tubing T is then pulled through a cooling tank (not shown) or is cooled by a coil mounted around the tubing T to completely set the plastic. It will be noted that the use of bobbins provides fibers of continuous, indefinite or infinite length.

It will be apparent from FIGS. 1–3 that if the mandrels 36 and 38 are rotated in opposite directions and each of the openings is threaded with glass fibers, the internal configuration of the internally reenforcing fibers will be as shown in FIG. 4a. In the event one of the mandrels is rotated and the other mandrel remains stationary, it will be further evident that the internal pattern of the reenforcing fibers will be as shown in FIG. 4b. Moreover, if both mandrels are kept stationary it will be obvious that the internal pattern of the reenforcing fibers will be as shown in FIG. 4c.

The specific embodiment disclosed sets forth an apparatus in which six bobbins 44, 46, 48, 50, 52, and 54 are employed, but it will be evident that the number of bobbins employed is a matter of choice usually varying from two to six or more.

From the foregoing description it will be apparent that there has been devised a novel method and apparatus for embedding fibers or the like reenforcing members on the inner surface of tubing whereby an effective reenforcement of the tubing is effected without the disadvantages usually associated with other methods such as the simultaneous extruding of the tubing and fibers from the extruder die plate. It is to be particularly noted that with the present appartus in which drilled openings 37 and 37' are provided within mandrels 36 and 38, there is no likelihood of the fibers 39 and 41 becoming tangled or fouled during the extrusion of the tubing T so as to necessitate frequent stoppage of the apparatus. In addition, where transparent plastic material is employed novel patterns can be imparted to the tubing particularly where the fibers are of different colors.

Various modifications will also be apparent to those skilled in the art. For example, positive take-off means may be used to facilitate the forward advancement of the tubing T as it is delivered from the extruder die 34. By increasing the amount of heat applied by the heaters 32 it is possible to make the extruded tubing T more plastic as it issues from the extruder die and thereby insure the embedding of the fibers within the inner surface of tubing T. Of course various plastic materials may be employed such as polyethylene, polystyrene and polypropylene. For certain uses it may be desirable to employ reenforcing fibers, strands, or threads which are of different color, particularly for identification purposes.

While a specific embodiment of the invention has been shown and described in detail to illustrate the method and apparatus of the present invention, it will be understood that the invention can be embodied otherwise as suggested above without departing from the inventive principles set forth.

What is claimed is:

1. An apparatus for manufacturing plastic tubing which is fiber-reenforced on its inner surface comprising a centripetal extruder having a die member with an opening therein, a rotary member having a central axis for effecting extrusion of hot plastic tubing from said die member opening, a stationary mandrel extending from said die member opening and positioned within the tubing so as to size said tubing, a first means located along the central axis of said rotary member for guiding at least one fiber longitudinally onto said mandrel from a source of fibers of continuous length, a second means located near the central axis of said rotary member and concentric to said first means for guiding at least one fiber longitudinally onto said mandrel as the tubing is passed over said mandrel, and means for cooling the thus formed plastic tubing having fibers embedded on the internal surface thereof so as to set the tubing into a rigid and non-collapsible form.

2. The apparatus of claim 1 wherein the first means is a rotary mandrel.

3. The apparatus of claim 2 wherein the second means is also a rotary mandrel.

4. The apparatus of claim 1 wherein the first means is a stationary mandrel.

5. The apparatus of claim 4 wherein the second means is a stationary mandrel.

6. The apparatus of claim 2 wherein the rotary mandrel has a plurality of openings therein to provide for the passage of a plurality of separate fibers.

7. The apparatus of claim 3 wherein the rotary mandrel has a plurality of openings therein to provide for the passage of a plurality of separate fibers.

8. In an extruder having means for extruding tubing including a die and a first mandrel axially spaced from the die for sizing the tubing; a number of additional mandrels positioned in said means and having means for guiding elongated reenforcing members onto said first mandrel to be received in the tubing as it is sized over said first mandrel.

9. The extruder defined in claim 8 wherein said number of additional mandrels includes at least one rotary mandrel.

10. The extruder defined in claim 8 wherein said number of additional mandrels includes two counter-rotatable mandrels.

11. The extruder defined in claim 8 wherein said first means includes a rotary member for extruding the tubing through centripetal force, said rotary member having a hollow passage receiving said additional mandrels and said additional mandrels are sleevelike members positioned in telescoping interrelationship in said passage of said rotary member.

12. A centripetal extruder comprising in combination, a casing having an outlet opening through which products are extruded, a rotary member in the casing for centripetally extruding products through said opening, said rotary member having a passage coaxial with said outlet opening, and a mandrel in said passage of said rotary member having means for guiding elongated reenforcing members into the extruded product.

13. The centripetal extruder defined in claim 12 wherein said mandrel is rotatably mounted in said passage of said rotary member.

14. The centripetal extruder defined in claim 12 wherein said mandrel extends into said outlet opening and is spaced from the portions of the casing defining the outlet opening whereby tubing is extruded from the outlet opening.

15. The centripetal extruder defined in claim 14 wherein there is further provided a stationary mandrel in the tubing spaced axially and outwardly from said outlet opening for sizing the tubing and receiving the reenforcing members and guiding them into the internal surface of the extruded tubing.

16. In the method of extruding tubing through a centripetal extruder having a rotary member with a through passage for rotating substance to be extruded to provide centripetal forces for extrusion, the steps of sizing the tubing by a mandrel after said tubing leaves the extruder and reenforcing said tubing by passing reenforcing members through the passage of the rotary member and onto the sizing mandrel to embed the reenforcing members in the inner surface of the tubing.

References Cited by the Examiner

UNITED STATES PATENTS

| | | | |
|---|---|---|---|
| 1,933,019 | 10/1933 | Laubi | 214—173 X |
| 2,708,772 | 5/1955 | Moncrieff | 18—14 X |
| 2,887,721 | 5/1959 | Blanchi et al. | 18—13 X |
| 3,032,814 | 5/1962 | Miner | 18—12 |
| 3,067,084 | 12/1962 | Nolle et al. | 18—14 X |
| 3,262,154 | 7/1966 | Volyi | 18—12 |

WILLIAM J. STEPHENSON, *Primary Examiner.*